United States Patent [19]

Shah

[11] Patent Number: 5,192,020

[45] Date of Patent: Mar. 9, 1993

[54] INTELLIGENT SETPOINT CHANGEOVER FOR A PROGRAMMABLE THERMOSTAT

[75] Inventor: Dipak J. Shah, Eden Prairie, Minn.

[73] Assignee: Honeywell Inc., Minneapolis, Minn.

[21] Appl. No.: 789,503

[22] Filed: Nov. 8, 1991

[51] Int. Cl.⁵ ............................................. G05D 23/19
[52] U.S. Cl. ..................................... 236/46 R; 165/12
[58] Field of Search ....................... 236/46 R; 165/12; 62/231

[56] References Cited

U.S. PATENT DOCUMENTS

| | | | |
|---|---|---|---|
| 3,292,387 | 12/1966 | Harbour | 62/231 X |
| 3,979,059 | 9/1976 | Davis et al. | 236/46 R |
| 4,292,813 | 10/1981 | Paddock | 165/12 X |
| 4,308,991 | 1/1982 | Peinetti et al. | |
| 4,446,913 | 5/1984 | Krocker | |
| 4,453,590 | 6/1984 | Holliday et al. | |
| 4,469,274 | 9/1984 | Levine | |
| 4,620,668 | 11/1986 | Adams | |
| 4,623,969 | 11/1986 | Bensoussan et al. | |
| 4,751,961 | 6/1988 | Levine et al. | |
| 4,759,498 | 7/1988 | Levine et al. | |
| 4,771,392 | 9/1988 | Hall | |
| 4,809,516 | 3/1989 | Jones | |
| 4,817,705 | 4/1989 | Levine et al. | |
| 4,843,084 | 6/1989 | Parker et al. | |
| 4,884,214 | 11/1989 | Parker et al. | |
| 4,897,798 | 1/1990 | Cler | |
| 4,901,917 | 2/1990 | Littell, III | |
| 4,909,041 | 3/1990 | Jones | |

*Primary Examiner*—Stephen M. Hepperle
*Attorney, Agent, or Firm*—Ian D. MacKinnon

[57] ABSTRACT

An apparatus to match initiation of temperature changeover settings of a thermostat to a duty cycle of an air temperature conditioning plant without degrading the comfort level of the area of temperature modification. The apparatus prevents short-cycling of either a heating or a cooling system which can occur due to changes in the setpoint temperature. The apparatus operates by determining the length of time of "on" portion and "off" portion of the duty cycle of the air temperature conditioning plant. It then determines the time until the upcoming cycle of the temperature conditioning plant and either advances or delays the temperature changeover until the beginning of the upcoming "on" period or the upcoming "off" period of the upcoming duty cycle, or the last "on" period or the last "off" period of the last duty cycle of the air temperature conditioning plant.

18 Claims, 9 Drawing Sheets

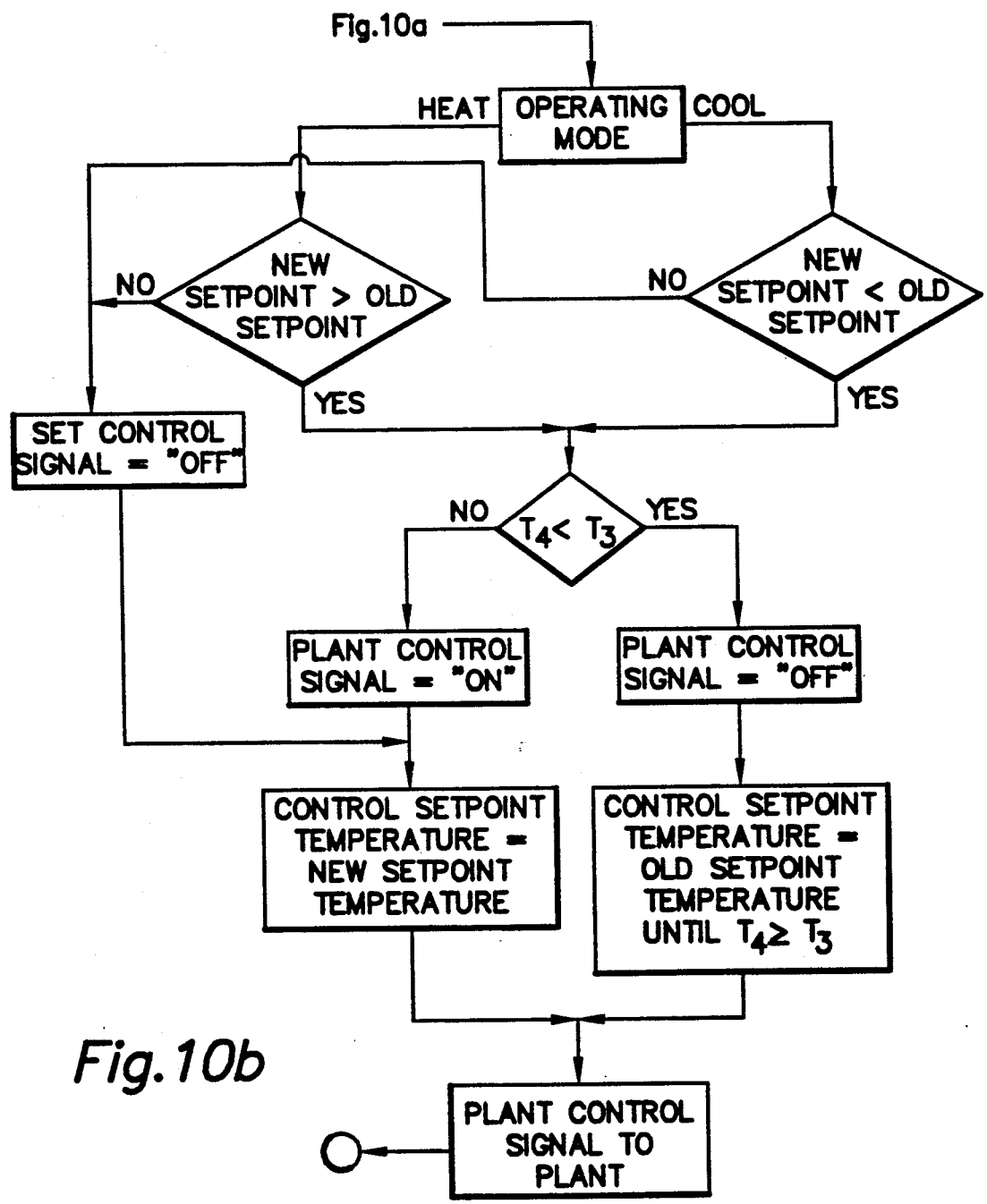

INTELLIGENT SETPOINT CHANGEOVER FOR A PROGRAMMABLE THERMOSTAT

BACKGROUND OF THE INVENTION

The present invention pertains to an apparatus which matches the initiation of temperature changeover by a thermostat to a duty cycle of an air temperature conditioning plant.

Current programmable thermostats perform temperature setpoint change, i.e., setback in heating mode, setup in cooling mode, for energy conservation purposes. The current thermostats perform the temperature setpoint change at pre-programmed times without regard to the current "on"/"off" status of the heating/cooling plant at that instant. Further, the temperature setpoint change is without regard to whether the heating/cooling plant can be retained "on" or "off" (without adversely effecting the comfort conditions of the occupants) during the time between the present and the pre-programmed scheduled time for setup/setback. One of the drawbacks of the existing approach is that energy conservation can be reduced if there is a change in the setpoint temperature during the plant "on" cycle due to the setup/setback such that the plant is required to go "off", or if the plant is in an "off" cycle and the inverse occurs. Additionally, such abrupt changes in the plant "on"/"off" status can reduce the plant efficiency and result in equipment short-cycling. At any one instance in time, these drawbacks may sound fairly insignificant; however, over an extended period of time, the amount of energy conserved can be quite significant and the equipment short-cycling can result in a reduction in the expected operating life span of the heating and cooling plant.

With the advent of microprocessor-based electronic thermostats utilizing computers and relevant software as the primary controllers for heating and cooling plants, it has become possible to perform intelligent setup and setback without significant increases in manufacturing costs and without significant software revisions to existing systems by incorporating this invention. Furthermore, energy conservation, which is the primary reason for using programmable thermostats, and an extension in the equipment life can be increased by utilizing this invention.

SUMMARY OF THE INVENTION

The invention is an apparatus to match initiation of temperature changeover settings of a thermostat to a duty cycle of an air temperature conditioning plant without degrading comfort level.

The apparatus has a programmable changeover thermostat, with input means for programming the thermostat with changeover temperature settings at selectable time of day periods, and a clock means to determine the time of day. The apparatus also has a timing means for determining the length of time of an "on" portion and an "off" portion of the duty cycle of the air temperature conditioning plant. A comparison means is used to determine the time until the next temperature changeover time. The apparatus further comprises a means to advance or delay the temperature changeover until the beginning of the next "on" period or the next "off" period of the next duty cycle. The means may advance or delay the temperature changeover until the last "on" period or the last "off" period of the duty cycle of the air temperature conditioning plant until the next temperature changeover is less than the time of the last "on" period duty cycle or less than the time of the last "off" period duty cycle of the air temperature conditioning plant.

Other objects and advantages of the present invention will be apparent from the following description of a preferred embodiment thereof and from the attached drawing.

DESCRIPTION OF THE PREFERRED EMBODIMENT

Figure 1:
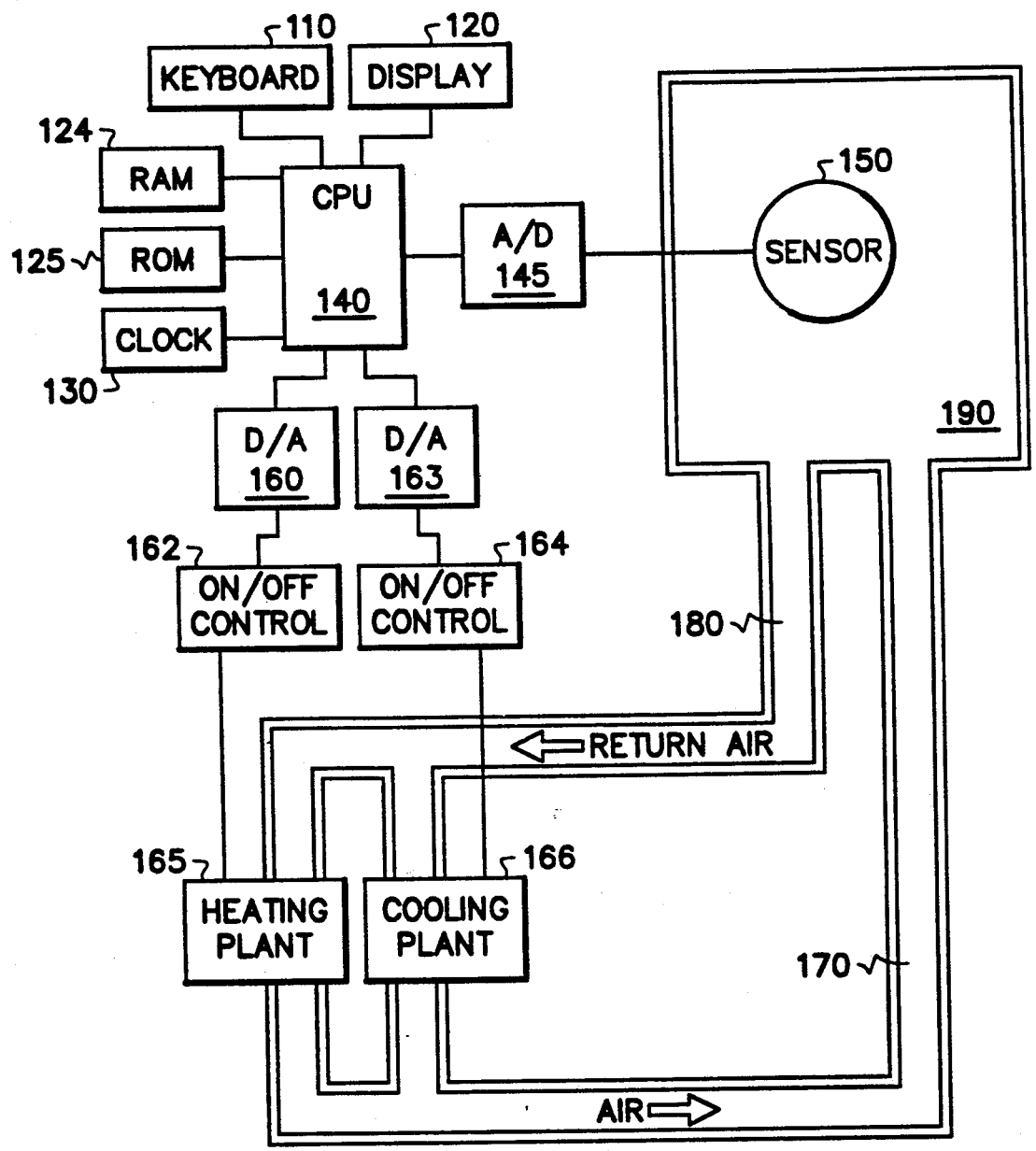
FIG. 1 is schematic representation of the heating and cooling system.

FIG. 1 illustrates a standard heating and cooling system in schematic form. A standard thermostat incorporates keyboard 110 for inputting the desired programs into the thermostat, display 120 which is utilized to display the information required in programming the thermostat, both RAM 124 and ROM 125 memory, and clock 130 which generally operates at 32.768 kHz for easy manipulation into "time of day" functions. Sensor means 150 is required such that the thermostat may determine the current temperature of the area of temperature modification. Central processing unit 140 is utilized in order to accumulate all of the information and provide an output to control means 162 and 164. Programmable thermostats are illustrated in numerous U.S. patents. Examples include U.S. Pat. No. 4,314,665 and Re32,960, both of which were issued to Levine, and which are hereby incorporated by reference. Control means 162 and 164 are utilized to either turn "on" or "off" heating plant 165 or cooling plant 166. Central processing unit 140 times the "on" and "off" periods based on when "on" and "off" commands are provided. The heating system and cooling system further incorporate heating plant 165 and cooling plant 166 for modifying the air temperature, means for distributing the heated or cooled air 170 to the area of temperature modification 190 and means for returning the air 180. These means are generally referred to as the heating (supply) ducts 170 and the return ducts 180. The area of temperature modification 190 most commonly is either the living quarters or work area which generally comprises either a single or a group of rooms in a building.

Figure 2:
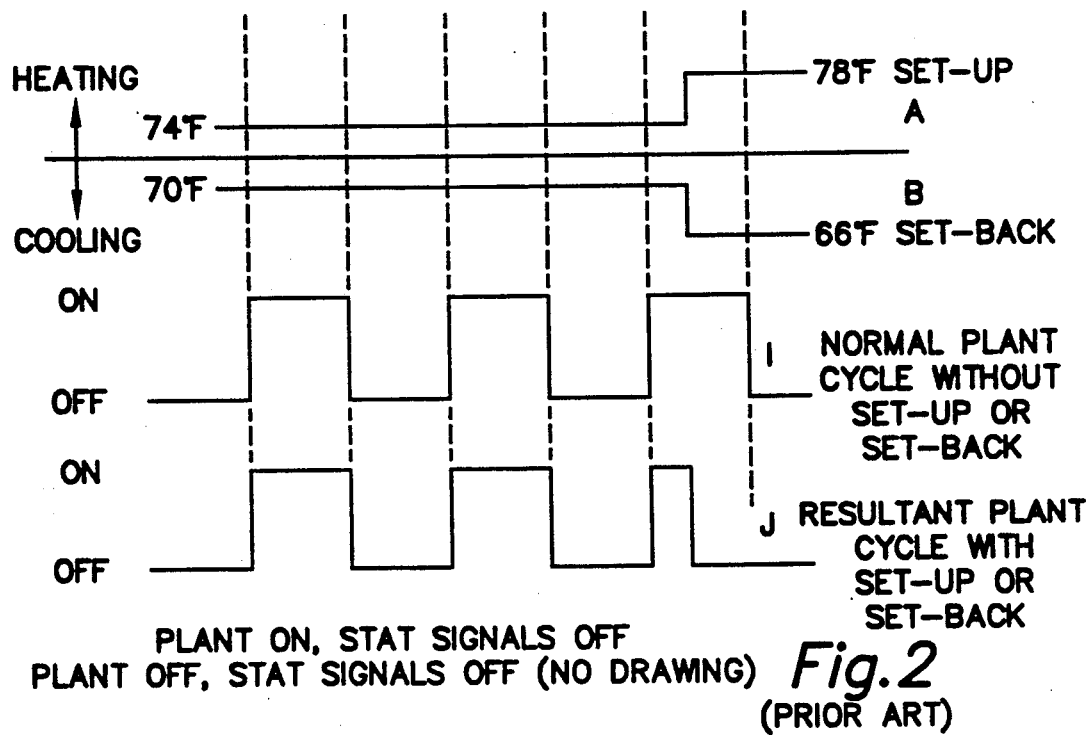
FIG. 2 is a timing diagram which illustrates the normal plant cycle without setup or setback versus the resulting plant cycle with setup or setback.
Figure 3:
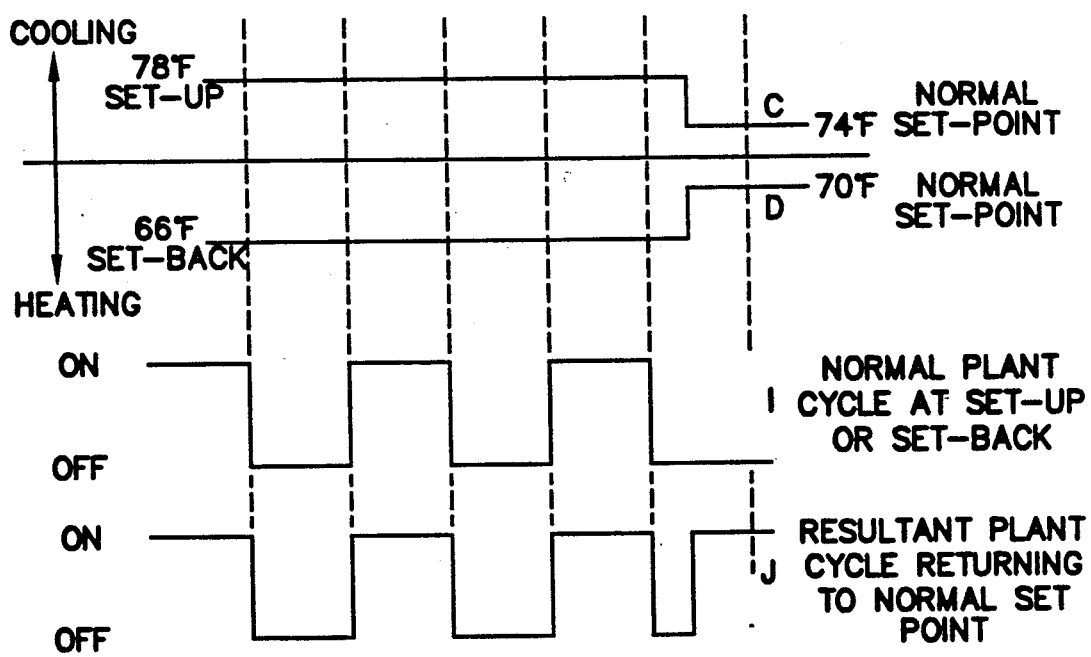
FIG. 3 illustrates the normal plant cycle at setup or setback versus the resulting plant cycle returning to a normal setpoint.

FIGS. 2 and 3 illustrate the problems associated with the prior art temperature setup/setback functions. As is illustrated in FIG. 2, in a case where the heating system wishes to change from an "on" state to an "off" state prior to the end of the cycle, the resulting plant cycle will be a short cycle. Lines A and B illustrate the desired temperature which the occupant wishes to have over a set period of time. As a result, plant cycles may not be in sync with temperature changeovers. Line I illustrates the normal plant cycles over time for the condition of no change in setpoint temperature, while line J illustrates the plant cycles that result if temperature changeover results during a plant cycle. For instances, in line A, the cooling system is "on" for two cycles and during the third cycle the temperature is set up to a higher temperature, thereby turning the cooling system "off" and short-cycling the cooling plant. In line B, the system utilizes a heating function and the system again shuts down during the third cycle. In this case, the heating plant is subject to short-cycling. In either example A or example B, the plant is subject to short-cycling which decreases the system efficiency and shortens the life of the plant. Further, as the system is only being turned on for a short period of time, the actual temperature of the area which is being heated or cooled will not change significantly and, in essence, this energy required for this short cycle is wasted.

FIG. 3 illustrates a system where the heating or cooling system wishes to turn on shortly after the plant has cycled to an "off" state. Line K illustrates a normal plant cycle for no change in setpoint, while line L illustrates the plant cycle due to setpoint changeover. Line C illustrates an example of when an air conditioning unit may be used when the temperature is at a first higher temperature, generally indicative of an unoccupied time period, and is later set to a lower temperature, generally indicative of an occupied time period. Line D illustrates the heating function in which a lower temperature is later set to a higher temperature. In both cases, in lines C and D the setpoint is changed immediately following the plant cycling to an "off" state. Then shortly into this "off" state, the plant is required again to cycle "on", thereby short-cycling the system again. As in the example of FIG. 2, the plant again is subject to short-cycling which decreases the system efficiency and shortens the life of the plant. Applicant's invention prevents the waste of energy and the short-cycling of the plant.

Figure 4:
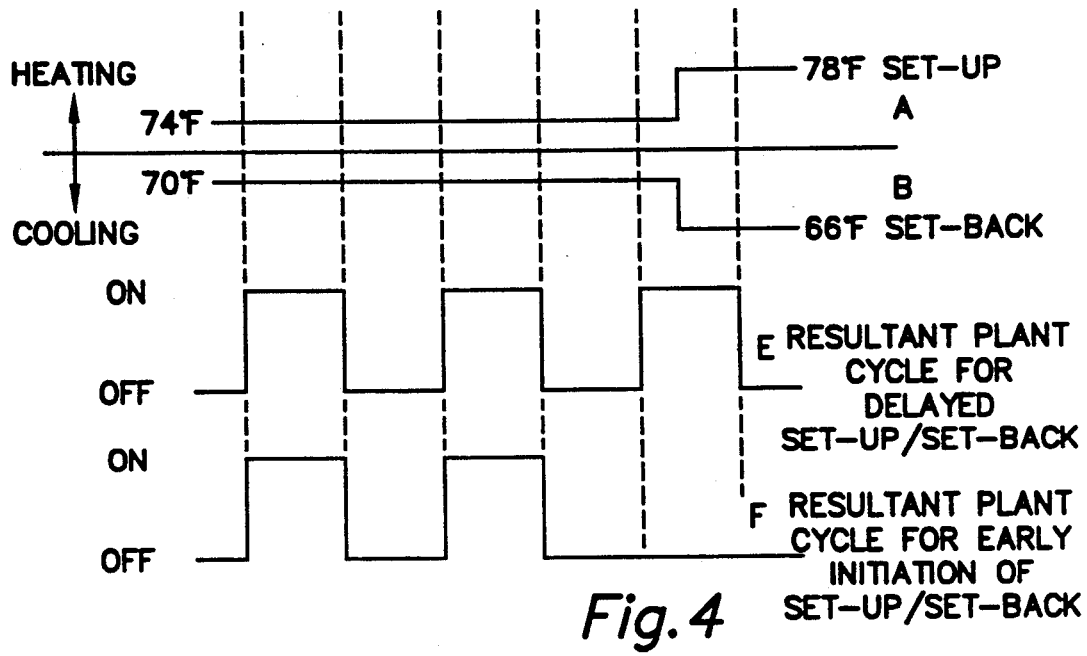
FIG. 4 illustrates the plant cycle when applicant's invention is applied as demonstrated in FIGS. 6 and 7.

FIG. 4 illustrates the application of applicant's invention to the situation illustrated in FIG. 2. Lines A and B of FIG. 4 correspond with lines A and B of FIG. 2. Lines E and F illustrate the result of applying applicant's invention to the heating or the cooling system. Line E illustrates the resulting plant cycle wherein the plant will be allowed to complete a full cycle. In this way, the temperature may not setup or setback as quickly as it would have in FIG. 2; however, the plant will not short-cycle. Thereby the life of the plant is not decreased and the occupied room also maintains its comfort level longer. Example F is applicable for the situation in which the short period remaining before the setup or setback will not greatly effect the room temperature and, therefore, the plant is prevented from cycling. This also increases the life of the plant by not short-cycling it and prevents energy from being wasted.

Figure 5:
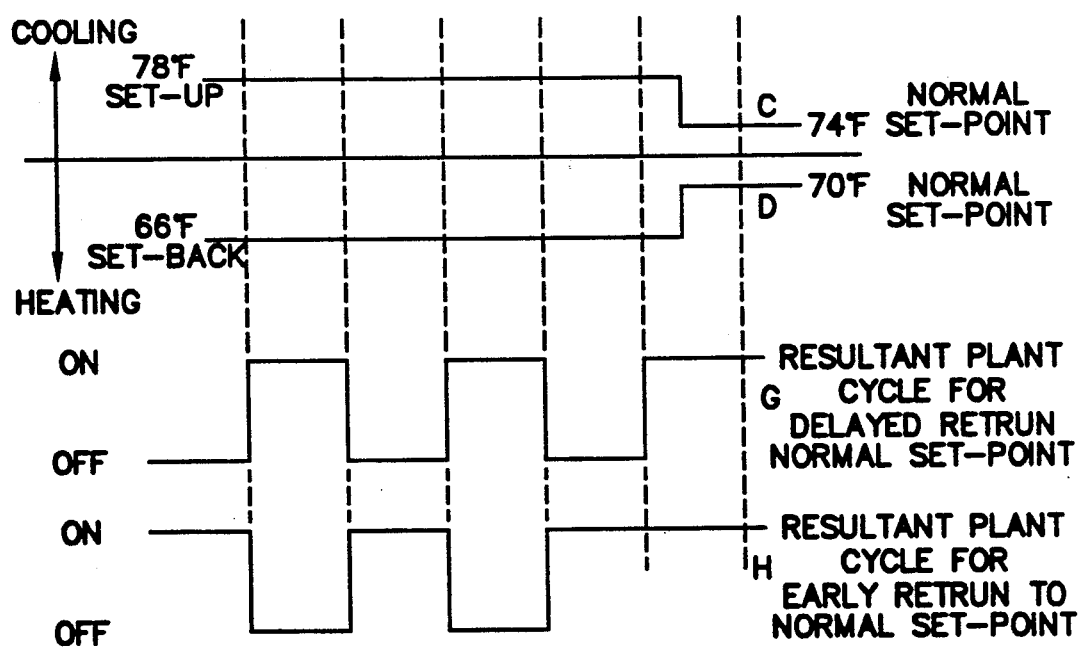
FIG. 5 indicates the timing diagram for plant cycles as indicated in FIGS. 8 and 9.

FIG. 5 illustrates applicant's invention as applied to the situation illustrated in FIG. 3. Lines C and D of FIG. 5 correspond to lines C and D of FIG. 3. Line G illustrates a system which is allowed to complete its "off" cycle before turning "on", thereby preventing the short-cycling. In line H, in order to prevent the short "off" cycle, the system is continued in the "on" cycle, resulting in the room reaching the new setpoint sooner and preventing the short "off"/"on" cycle which would harm the plant.

FIGS. 6 through 9 illustrate the flowcharts which must be programmed into the thermostat in order to implement applicant's invention. Some definitions are helpful in understanding FIGS. 6 through 9.

T1 = difference between current time and time for setpoint changeover.
T2 = duration of last "on" state.
T3 = duration of last "off" state.
T4 = difference between current time and time at which the plant went "off".
T5 = difference between current time and time at which plant came "on".

Figure 6:
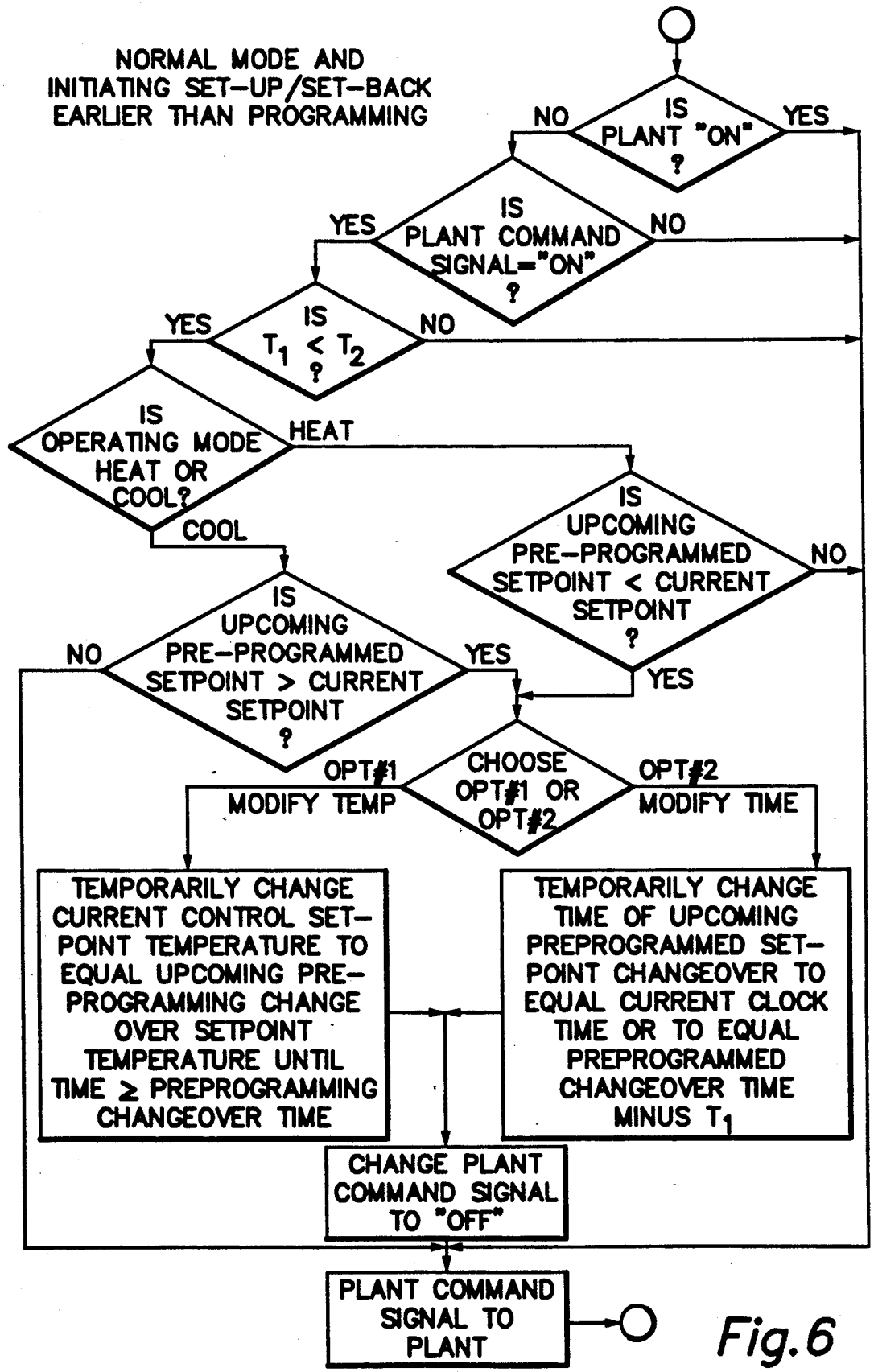
FIG. 6 is a flowchart representing initiation of setup/setback earlier than a pre-programmed time.

FIG. 6 is representative of the program which provides for a system which operates as that demonstrated in line F of FIG. 4. Step 1 is to determine whether or not the plant is "on". If the plant is "on", the plant command signal is sent to the plant and the system operates normally. If the plant is "off", the system questions whether the plant command signal is "on". If the plant command signal is not "on", the plant is retained "off". If the plant command signal is "on", the system compares T1 with T2. If T1 is greater than or equal to T2, the plant command signal is sent to the plant and the system continues to operate normally. If T1 is less than T2, however, the system questions whether the operating mode is heating or cooling. If it is in the heating mode, the question is whether or not the upcoming pre-programmed setpoint is less than or greater than the current setpoint. If the upcoming pre-programmed setpoint is greater, then the plant command signal is sent to the plant and the system continues to operate normally. If the upcoming setpoint is less than the current setpoint, then the system chooses option 1 or 2. For cooling operation, the system asks if the upcoming pre-programmed setpoint is greater than the current setpoint. If not, the system continues to operate normally. If the upcoming setpoint is greater than the current setpoint, then it again chooses between option 1 or option 2. Option 1 is to temporarily change the current control setpoint temperature to equal the upcoming pre-programmed changeover setpoint temperature until time is greater than or equal to the pre-programmed changeover time. Option 2 is to temporarily change the time of the upcoming pre-programmed setpoint changeover to equal the current clock time or to equal the pre-programmed changeover time minus T1. After executing option 1 or option 2, the plant command signal is changed to "off" and sent to the plant.

Figure 7:
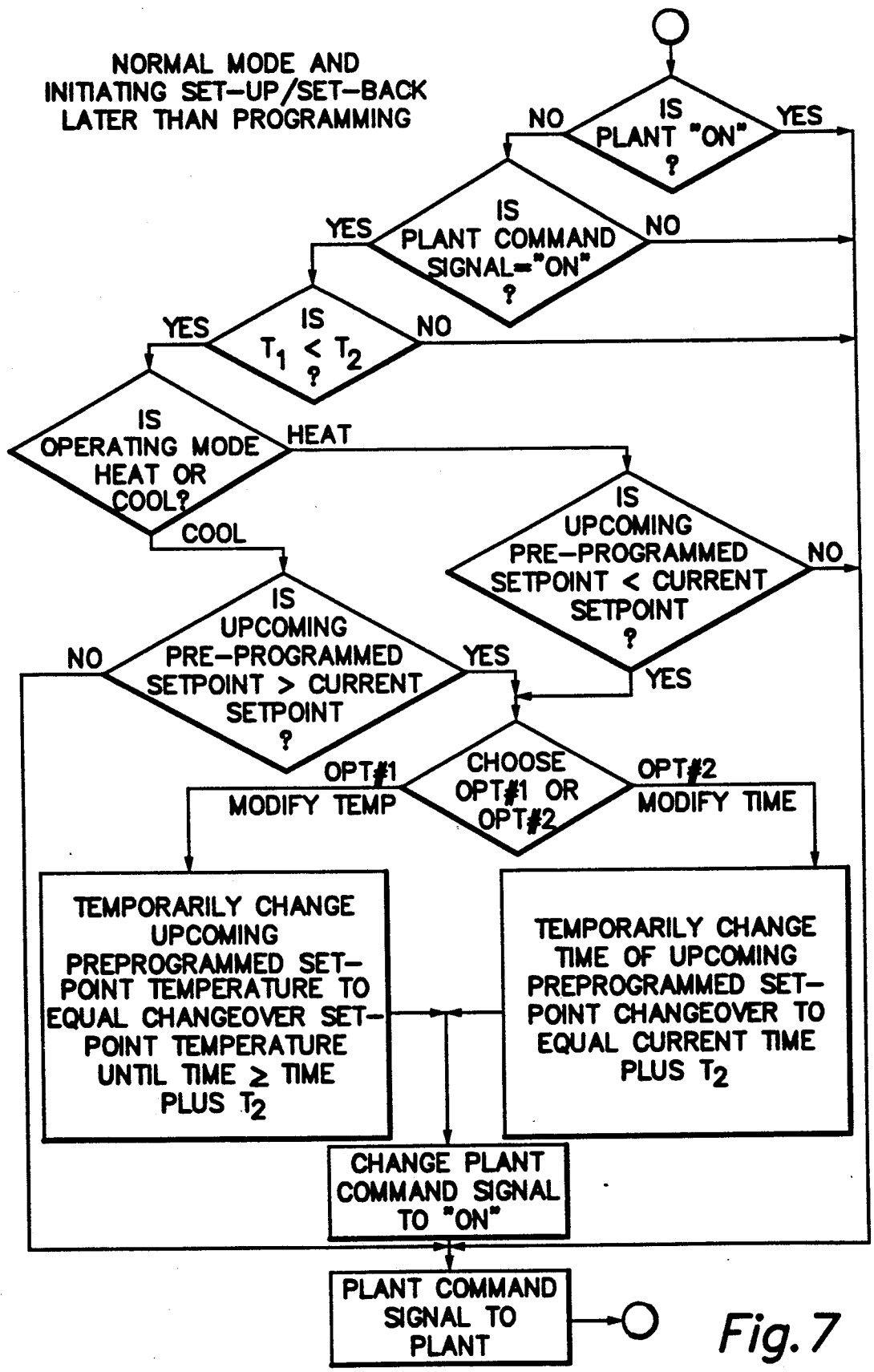
FIG. 7 is a flowchart representing initiation of setup/setback later than a pre-programmed time.

FIG. 7 is representative of a program which provides for a system which operates as that demonstrated by line E of FIG. 4. If the plant is "on", the plant command signal is sent to the plant and the system operates normally. If the plant is "off", the system questions whether the plant command signal is "on". If the plant command signal is not "on", the plant is retained "off". If the plant command signal is "on", then T1 is compared with T2. If T1 is greater than or equal to T2, the plant command signal is sent to the plant and the system continues to operating normally. If T1 is less than T2, however, the system questions whether the operating mode is heating or cooling. If it is in the heating mode and the upcoming pre-programmed setpoint is greater than the current setpoint temperature, then the plant command signal is sent to the plant and the system continues to operate normally. If the upcoming setpoint is less than the current setpoint, then the system chooses option 1 or option 2. If the operating mode is cooling and the upcoming pre-programmed setpoint is not greater than the current setpoint, the system continues to operate normally. If the upcoming pre-programmed setpoint is greater than the current setpoint, then it again chooses between option 1 or option 2. Option 1 is to temporarily change the upcoming pre-programmed setpoint temperature to equal the current control setpoint temperature until time is greater than or equal to the current time plus T2. Option 2 is to temporarily change the time of the upcoming pre-programmed setpoint changeover to equal the current clock time plus T2. After executing option 1 or option 2, the plant command signal is changed to "on" and sent to the plant.

Figure 8:
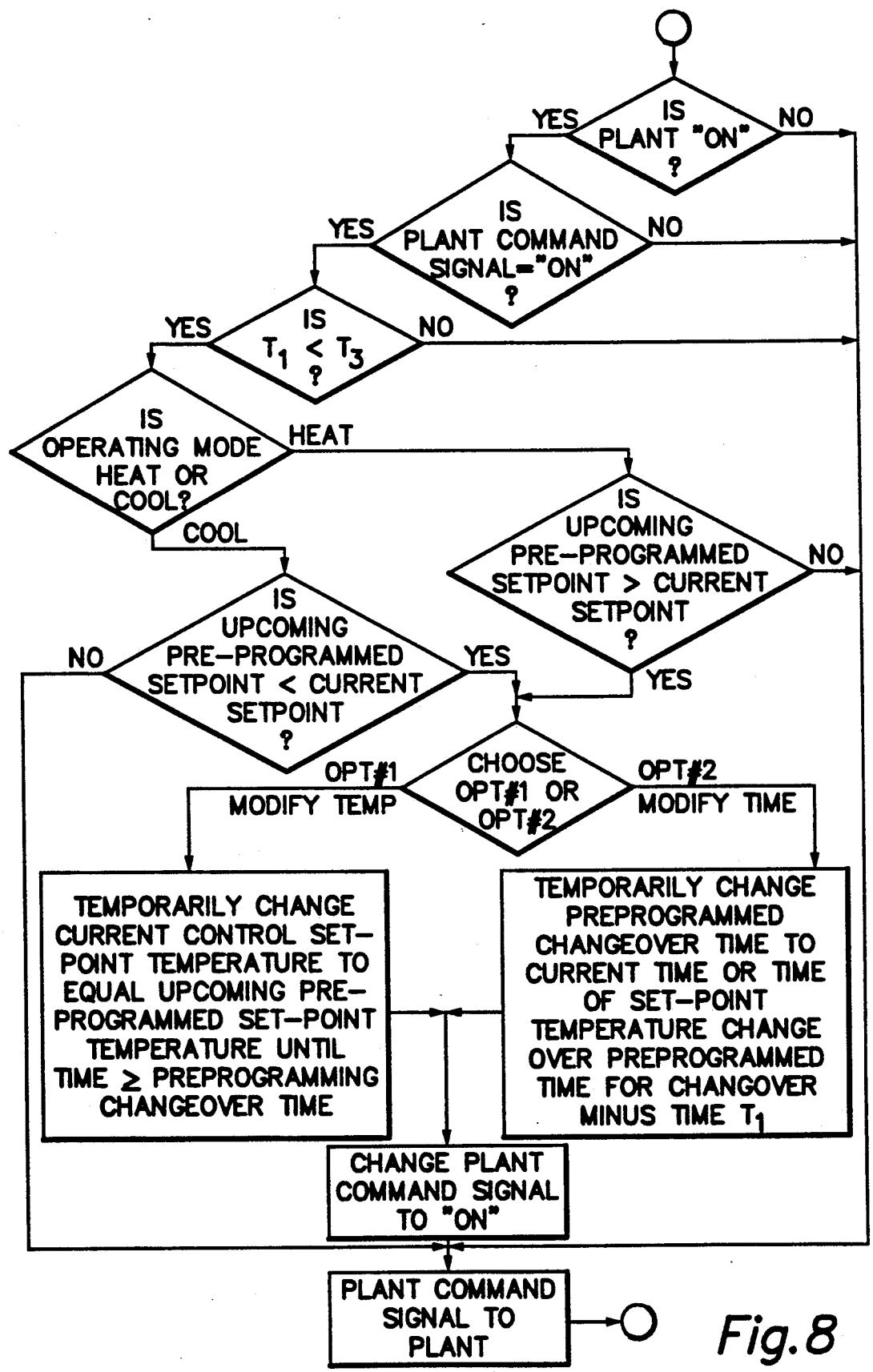
FIG. 8 illustrates a flowchart for initiating return to a normal setpoint temperature earlier than programmed.

FIG. 8 is representative of a program which provides for a system which operates as that demonstrated by line H of FIG. 5. If the plant is not "on", the plant command signal is sent to the plant and the system operates normally. If the plant is "on", the system questions whether the plant command signal is "off". If the plant command signal is not "off", the plant is retained "on". If the plant command signal is "off", then T1 is compared with T3. If T1 is greater than or equal to T3, the plant command signal is sent to the plant and the system continues to operate normally. If T1 is less than T3, however, the system questions whether the operating mode is heating or cooling. If it is in the heating mode and the upcoming pre-programmed setpoint is not greater than the current setpoint, then the plant command signal is sent to the plant and the system continues to operate normally. If the upcoming setpoint is greater than the current setpoint, then the system chooses option 1 or option 2. If the operating mode is cooling and the upcoming pre-programmed setpoint is not less than the current setpoint, the system continues to operate normally. If the upcoming pre-programmed setpoint is less than the current setpoint, then it again chooses between option 1 or option 2. Option 1 is to temporarily change the current control setpoint temperature to equal the upcoming pre-programmed setpoint temperature until time is greater than or equal to the upcoming pre-programmed changeover time. Option 2 is to temporarily change the time of the upcoming pre-programmed setpoint changeover to equal the current clock time or to equal the pre-programmed changeover time minus T1. After executing option 1 or option 2, the plant command signal is changed to "on" and sent to the plant.

Figure 9:
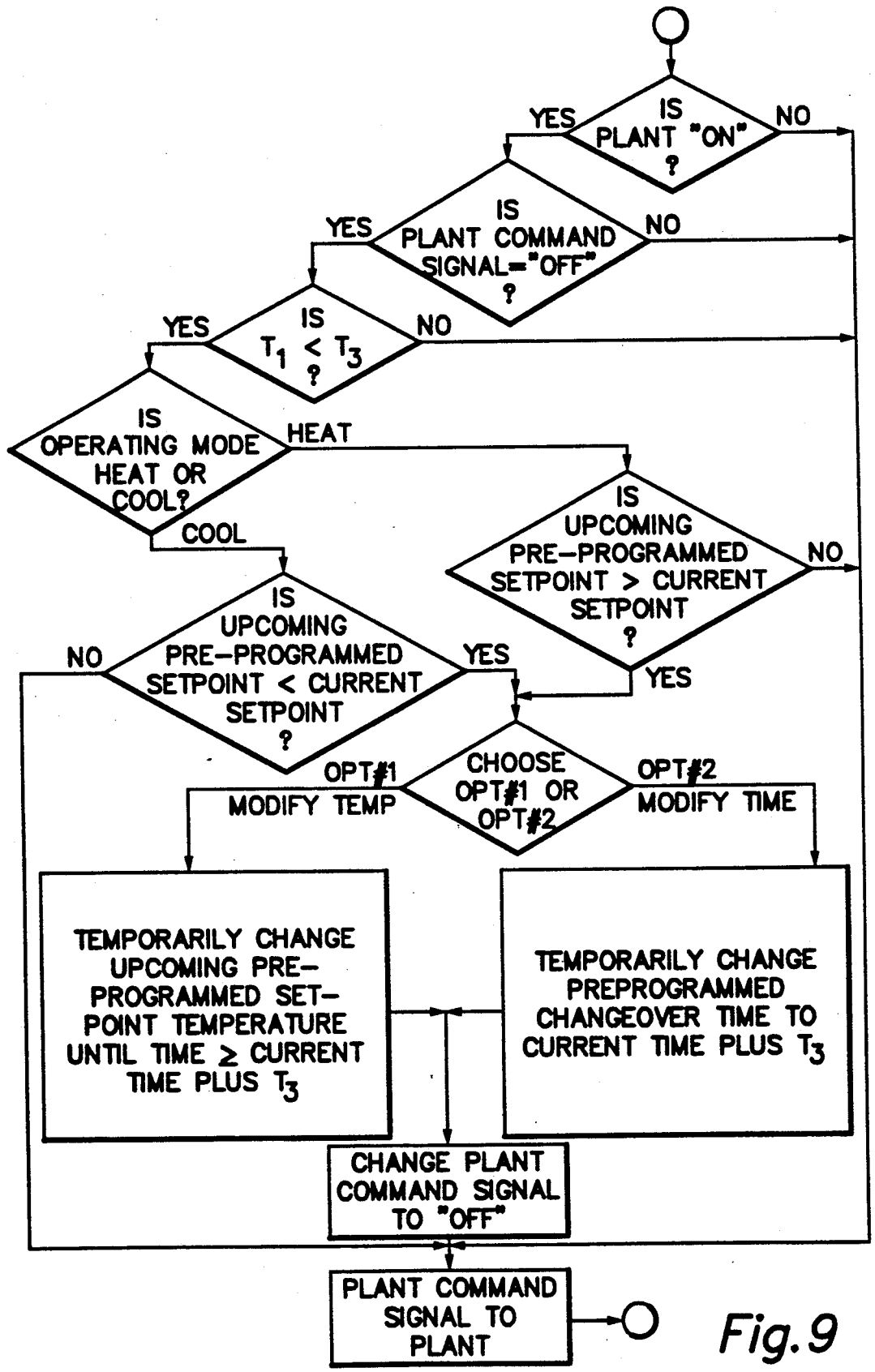
FIG. 9 illustrates a flowchart for delaying return to a normal setpoint temperature.

FIG. 9 is representative of a program which provides for a system which operates as that demonstrated by line G of FIG. 5. If the plant is not "on", the plant command signal is sent to the plant and the system operates normally. If the plant is "on", the system questions whether the plant command signal is "off". If the plant command signal is not "off", the plant is retained "on". If the plant command signal is "off", then T1 is compared with T3. If T1 is greater than or equal to T3, the plant command signal is sent to the plant and the system continues to operate normally. If T1 is less than T3, however, the system questions whether the operating mode is heating or cooling. If it is in the heating mode and the upcoming pre-programmed setpoint is not greater than the current setpoint, then the plant command signal is sent to the plant and the system continues to operate normally. If the upcoming setpoint is greater than the current setpoint, then the system chooses option 1 or option 2. If the operating mode is cooling and the upcoming pre-programmed setpoint is not less than the current setpoint, the system continues to operate normally. If the upcoming pre-programmed setpoint is less than the current setpoint, then it again chooses between option 1 or option 2. Option 1 is to temporarily change the upcoming pre-programmed changeover setpoint temperature to equal the current setpoint temperature until time is greater than or equal to the current time plus T3. Option 2 is to temporarily change the time of the upcoming pre-programmed setpoint changeover to equal the current clock time plus T3. After executing option 1 or option 2, the plant command signal is changed to "off" and sent to the plant.

Figure 10A:
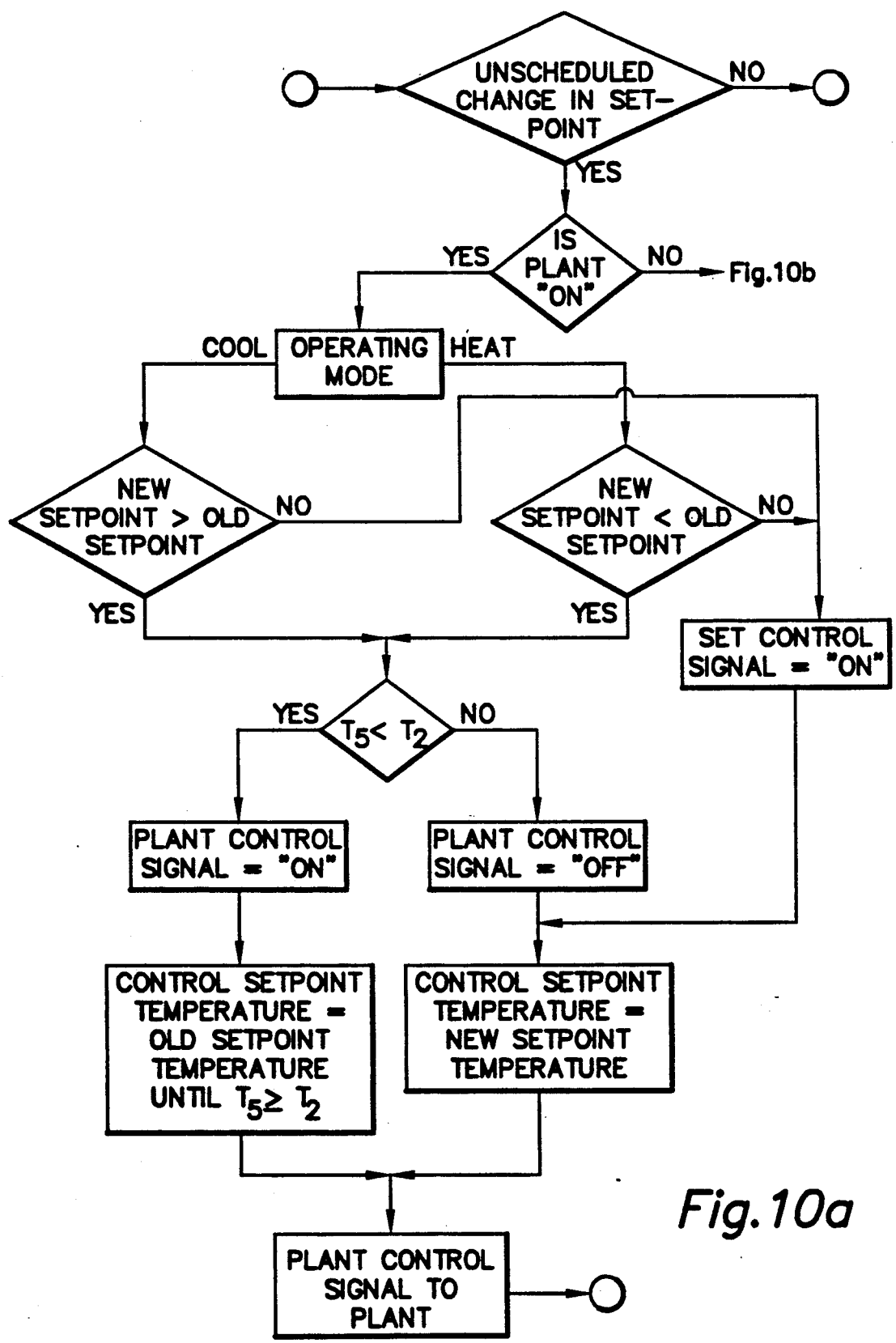
FIG. 10 is a flowchart for advancing and/or retarding the change in control setpoint temperature dictated by human intervention.

These techniques for advancing and/or retarding the onset of change in setpoint temperature, although described in the above for application in situations where the setpoint temperature changeover is pre-programmed, are equally applicable for the situation of non-preprogrammed setpoint changeover. An example is in the case of human intervention in raising and/or lowering the current control setpoint temperature. In such cases, if the setpoint changeover will cause a change in the "on" or "off" status of the heating/cooling plant, then the current status is permitted to complete normally before the before honoring the requested change in setpoint. For example, if the plant (heating or cooling) is "on" and human intervention dictates a change in setpoint temperature which will cause the plant to go "off", then implementation of the requested setpoint changeover may be delayed until after the plant goes "off" under the current control setpoint. The magnitude of this delay will be equal to the duration of the last complete "on" period (previously defined as T2) minus the amount of time spent in the current "on" state (previously defined as T5). Inversely, if the plant (heating or cooling) is "off" and human intervention dictates a change in setpoint temperature which will cause the plant to go "on", then implementation of the requested setpoint changeover may be delayed until after the plant goes "on" under the current control setpoint. The magnitude of this delay will be equal to the duration of the last complete "off" period (previously defined as T3) minus the amount of time spent in the current "off" state (previously defined as T4). A flowchart for implementing this option of advancing and/or retarding the onset or temperature setpoint changeover based on human intervention, in addition to the options for advancing and/or retarding the onset of temperature setpoint changeover based on pre-programmed values, is shown in FIG. 10.

The decision of whether to advance and/or retard the onset of pre-programmed temperature setpoint changeover, as an alternative of the previous embodiments, may be based on the time rate of change in the temperature of the conditioned space as monitored by the temperature sensor within the thermostat over a period of time. Thus, if the rate of change in temperature over time is "small" ("small" is either pre-programmed and/or selected by the occupant), then the onset of pre-programmed temperature setpoint changeover may be advanced and/or retarded as appropriate. In this case, the pre-programmed or occupant selected "small" time can be used instead of the previously defined parameters T2 and/or T3 as applicable. The "small" time or temperature as used in this context can be thought of as the minimum change in the space temperature that can be tolerated by the occupant before starting to feel uncomfortable. Thus, the thermostat monitors the rate at which the temperature within the conditioned space is changing, and based on the "small" time or temperature determines the values to be used for the parameters T2 and/or T3. For example, if the rate of change in temperature is 6 degrees per hour and it has been specified that a 1 degree change in temperature is tolerable, then the appropriate values to be used for T2 and/or T3 may be one-sixth of an hour (tolerance equal to 1 degree change in temperature divided by 6 degrees per hour rate of change in temperature) or 10 minutes. Alternatively, T2 and/or T3 may be fixed at either pre-programmed or occupant specified values.

The decision of whether to advance and/or retard the onset of the changeover in the setpoint temperature and when to select one or both features, is up to the designer/implementor. One might want to advance the onset of heating setback and/or cooling setup for daytime and/or unoccupied periods, and retard the onset of heating setback and/or cooling setup for nighttime and/or occupied conditions. Similarly, one may wish to advance and/or retard the time of return from the setup/setback temperature to normal setpoint temperature based on the specific application at hand. The decision to advance or retard may also be based on the ratio to T1 or T2 or the ratio of T1 to T3.

I claim:

1. An apparatus to match initiation of temperature changeover settings of a thermostat to a duty cycle of an air temperature conditioning plant without degrading comfort level comprising:
    a programmable changeover thermostat;
    an input means for programming said thermostat with changeover temperature settings at selectable time of day periods;
    a clock means to determine time of day;
    a timing means for determining the length of time of an "on" portion and an "off" portion of said duty cycle of said air temperature conditioning plant;
    a comparison means to determine a time until an upcoming temperature conditioning plant cycle;
    a means to advance or delay said temperature changeover until the beginning of the upcoming "on" period or upcoming "off" period of the upcoming duty cycle or the last "on" period or the last "off" period of the last duty cycle of said air temperature conditioning plant when the time until the upcoming temperature changeover is less than the time of the last "on" period duty cycle or less than the time of the last "off" period duty cycle of said air temperature conditioning plant.

2. An apparatus to match initiation of temperature changeover settings of a thermostat to a duty cycle of an air temperature conditioning plant without degrading comfort level of claim 1, wherein said means to advance or delay said temperature changeover advances said temperature changeover by changing said changeover temperature setting to said upcoming changeover temperature setting until the upcoming time of day period for the upcoming changeover temperature setting when the time until the upcoming temperature changeover is less than the time of the last "on" period duty cycle of said air temperature conditioning plant.

3. An apparatus to match initiation of temperature changeover settings of a thermostat to a duty cycle of an air temperature conditioning plant without degrading comfort level of claim 1, wherein said means to advance or delay said temperature changeover advances said temperature changeover by changing the upcoming pre-programmed temperature changeover setting time of day period to equal said time of day until the time of day equals said actual upcoming pre-programmed temperature changeover setting time of day when the time until the upcoming temperature changeover is less than the time of the last "on" period duty cycle of said air temperature conditioning plant.

4. An apparatus to match initiation of temperature changeover settings of a thermostat to a duty cycle of an air temperature conditioning plant without degrading comfort level of claim 1, wherein said means to advance or delay said temperature changeover delays said temperature changeover by changing said upcoming changeover temperature setting to said current changeover temperature setting until the time of day equals the current time of day plus the length of time of an "on" portion of said duty cycle of said air temperature conditioning plant when the time until the upcoming temperature changeover is less than the time of the last "on" period duty cycle of said air temperature conditioning plant.

5. An apparatus to match initiation of temperature changeover settings of a thermostat to a duty cycle of an air temperature conditioning plant without degrading comfort level of claim 1, wherein said means to advance or delay said temperature changeover delays said temperature changeover by changing said time of day for said upcoming changeover temperature setting to said current time of day plus said length of time of an "on " portion on said duty cycle of said air temperature conditioning plant when the time until the upcoming temperature changeover is less than the time of the last "on" period duty cycle of said air temperature conditioning plant.

6. An apparatus to match initiation of temperature changeover settings of a thermostat to a duty cycle of an air temperature conditioning plant without degrading comfort level of claim I, wherein said means to advance or delay said temperature changeover advances said temperature changeover by changing said changeover temperature setting to said upcoming changeover temperature setting until the time of day period equals the upcoming changeover time of day period when the time until the upcoming temperature changeover is less than the time of the last "off" period of said air temperature conditioning plant.

7. An apparatus to match initiation of temperature changeover settings of a thermostat to a duty cycle of an air temperature conditioning plant without degrading comfort level of claim 1, wherein said means to advance or delay said temperature changeover advances said temperature changeover by changing the upcoming pre-programmed temperature changeover setting time of day period to equal said time of day until the time of day equals said actual upcoming pre-programmed temperature changeover setting time of day when the time until the upcoming temperature changeover is less than the time of the last "off" period duty cycle of said air temperature conditioning plant.

8. An apparatus to match initiation of temperature changeover settings of a thermostat to a duty cycle of an air temperature conditioning plant without degrading comfort level of claim 1, wherein said means to advance or delay said temperature changeover delays said temperature changeover by changing said upcoming changeover temperature setting to said current changeover temperature setting until the time of day equals the current time of day plus the length of time of an "off" portion of said duty cycle of said air temperature conditioning plant when the time until the upcoming temperature changeover is less than the time of the last "off" period duty cycle of said air temperature conditioning plant.

9. An apparatus to match initiation of temperature changeover settings of a thermostat to a duty cycle of an air temperature conditioning plant without degrading comfort level of claim 1, wherein said means to advance or delay said temperature changeover delays said temperature changeover by changing said time of day for said upcoming changeover temperature setting to said current time of day plus said length of time of an "off" portion on said duty cycle of said air temperature conditioning plant when the time until the upcoming temperature changeover is less than the time of the last "off" period duty cycle of said air temperature conditioning plant.

10. A method to match initiation of temperature changeover settings of a thermostat to a duty cycle of an air temperature conditioning plant without degrading occupant comfort level comprising the steps of:
presetting a programmable changeover thermostat with a sequence of changeover temperature and time of day settings for initiation of each changeover temperature;
determining the length of time of an "on" portion and an "off" portion of a duty cycle of said air temperature conditioning plant;
determining a time until an upcoming temperature conditioning plant cycle; and
advancing or delaying said temperature changeover until the beginning of the upcoming "on" period or upcoming "off" period of the upcoming duty cycle or the last "on" period or the last "off" period of the last duty cycle of said air temperature conditioning plant when the time until the upcoming temperature changeover is less than the time of the last "on" period duty cycle or less than the time of the last "off" period duty cycle of said air temperature conditioning plant.

11. The method to match initiation of temperature changeover settings of a thermostat to a duty cycle of an air temperature conditioning plant without degrading occupant comfort level of claim 10, comprises the step of advancing said temperature changeover by changing said changeover temperature setting to said upcoming changeover temperature setting until the upcoming time of day period for the upcoming changeover temperature setting when the time until the upcoming temperature changeover is less than the time of the last "on" period duty cycle of said air temperature conditioning plant.

12. The method to match initiation of temperature changeover settings of a thermostat to a duty cycle of an air temperature conditioning plant without degrading occupant comfort level of claim 10, further comprises the step of advancing said temperature changeover by changing the upcoming pre-programmed temperature changeover setting time of day period to equal said time of day until the time of day equals said actual upcoming pre-programmed temperature changeover setting time of day when the time until the upcoming temperature changeover is less than the time of the last "on" period duty cycle of said air temperature conditioning plant.

13. The method to match initiation of temperature changeover settings of a thermostat to a duty cycle of an air temperature conditioning plant without degrading occupant comfort level of claim 10, further comprises the step of delaying said temperature changeover by changing said upcoming changeover temperature setting to said current changeover temperature setting until the time of day equals the current time of day plus the length of time of an "on" portion of said duty cycle of said air temperature conditioning plant when the time until the upcoming temperature changeover is less than the time of the last "on" period duty cycle of said air temperature conditioning plant.

14. The method to match initiation of temperature changeover settings of a thermostat to a duty cycle of an air temperature conditioning plant without degrading occupant comfort level of claim 10, further comprises the step of delaying said temperature changeover by changing said time of day for said upcoming changeover temperature setting to said current time of day plus said length of time of an "on" portion on said duty cycle of said air temperature conditioning plant when the time until the upcoming temperature changeover is less than the time of the last "on" period duty cycle of said air temperature conditioning plant.

15. The method to match initiation of temperature changeover settings of a thermostat to a duty cycle of an air temperature conditioning plant without degrading occupant comfort level of claim 10, further comprises the step of advancing said temperature changeover by changing said changeover temperature setting to said upcoming changeover temperature setting until time of day period equals the upcoming changeover time of day period the time until the upcoming temperature changeover is less than the time of the last "off" period of said air temperature conditioning plant.

16. The method to match initiation of temperature changeover settings of a thermostat to a duty cycle of an air temperature conditioning plant without degrading occupant comfort level of claim 10, further comprises the step of advancing said temperature changeover by changing the upcoming pre-programmed temperature changeover setting time of day period to equal said time of day until the time of day equals said actual upcoming preprogrammed temperature changeover setting time of day when the time until the upcoming temperature changeover is less than the time of the last "off" period duty cycle of said air temperature conditioning plant.

17. The method to match initiation of temperature changeover settings of a thermostat to a duty cycle of an air temperature conditioning plant without degrading occupant comfort level of claim 10, further comprises the step of delaying said temperature changeover by changing said upcoming changeover temperature setting to said current changeover temperature setting until the time of day equals the current time of day plus the length of time of an "off" portion of said duty cycle of said air temperature conditioning plant when the time until the upcoming temperature changeover is less than the time of the last "off" period duty cycle of said air temperature conditioning plant.

18. The method to match initiation of temperature changeover settings of a thermostat to a duty cycle of an air temperature conditioning plant without degrading occupant comfort level of claim 10, further comprises the step of delaying said temperature changeover by changing said time of day for said upcoming changeover temperature setting to said current time of day plus said length of time of an "off" portion on said duty cycle of said air temperature conditioning plant when the time until the upcoming temperature changeover is less than the time of the last "off" period duty cycle of said air temperature conditioning plant.

* * * * *